April 27, 1943.   C. C. COONS   2,317,519
REFRIGERATION
Filed Sept. 29, 1938   2 Sheets-Sheet 1

INVENTOR
Curtis C. Coons
BY
Harry S. Ducasse
ATTORNEY

April 27, 1943.  C. C. COONS  2,317,519
REFRIGERATION
Filed Sept. 29, 1938   2 Sheets-Sheet 2

INVENTOR
Curtis C. Coons
BY
Harry S. Demersse
ATTORNEY

Patented Apr. 27, 1943

2,317,519

UNITED STATES PATENT OFFICE 2,317,519

REFRIGERATION

Curtis C. Coons, North Canton, Ohio, assignor to The Hoover Company, North Canton, Ohio, a corporation of Ohio Application September 29, 1938, Serial No. 232,272

3 Claims. (Cl. 62—119.5)

This invention relates to refrigeration and more particularly, to an improved heat exchanger adapted for application as an absorber, condenser, or other heat exchange element of an absorption refrigerating apparatus, although it will be appreciated that the invention in its broader aspects pertains to finned heat exchangers generally in whatever environment they may be found or may be applied hereafter.

In order to illustrate more fully the various features of my heat exchanger, I have shown the same as constructed to render it suitable for use both as an absorber and as a condenser of an air-cooled absorption refrigeration machine of the continuously operating type using an inert pressure equalizing medium.

The designer is under strict limitations as to the size and position of the various parts of the apparatus, especially when such apparatus is applied to the cabinet of a domestic refrigerator, in which space is at a premium. In the case of absorption systems, the absorber must be of sufficient size to reject the heat of solution generated when the refrigerant vapor is absorbed by the absorption solution so that the weak solution will continue to absorb refrigerant vapor at the pressure prevailing in the system. At the same time, the absorber must be as small as possible so that it will not take up excessive space.

It is also well known that the size of the condenser is a limiting factor in the location of the evaporator at the top of the food storage compartment of a refrigerator. For obvious reasons, the evaporator should be as near the top of the compartment as possible. Since the condensate flows through the condenser and the evaporator by gravity, the evaporator must be positioned below the bottom of the condenser.

It is, therefore, of the greatest importance to make the absorber, condenser and other heat rejecting parts of the apparatus as efficient as possible.

In the past, these severe restrictions made it desirable to employ some power driven means, as a fan, for positively circulating a large volume of air over the absorber and condenser. According to the present invention, the heat radiating fins are so positioned on the fluid conveying means, and the heat exchangers as a whole are so positioned in the cooling air passageway as to greatly increase the flow of cooling air without the aid of power driven means.

It is accordingly an object of this invention to provide an improved and more efficient air-cooled heat exchanger, and more particularly, an absorber, condenser or other vessel for an absorption refrigerating apparatus.

It is another object of this invention to provide an improved heat exchanger of general application.

It has been discovered that if the fins of the heat exchanger are offset so as to have a greater area on the side of the heat exchanger opposite the incoming air so that the cool air will come in contact with the hot tube before or as it enters the space between the fins, a higher average temperature will prevail in the column of air between the fins than if the fins were centered or offset below the heat exchanger tubes. The result is a greatly increased circulation of air over the heat exchanger and, consequently, a more efficient heat exchanger.

It is accordingly another object of this invention to so position the fins of a heat exchanger relative to the tubes thereof that the incoming air will contact the hot tube and the hottest part of the fin as it enters the space between the fins.

It is another object of this invention to position the fins of a heat exchanger relative to the tubes thereof so that a higher average temperature and turbulent flow is produced in the column of air between the fins.

It is another object of this invention to position the fins of a heat exchanger relative to the tubes thereof so that a greater chimney effect and an increased circulation of air is produced in the space between the fins without the use of power-driven air circulating means.

It is another object of this invention to position the fins of a heat exchanger relative to the tubes thereof so that a greater utilization of the cooling effect of the air flowing thereover and a corresponding increase in efficiency is produced.

It is another object of this invention to produce a heat exchanger in which the lowest temperature available in the medium being cooled relative to the cooling air temperature is reduced below that of previously known heat exchangers.

It is another object of this invention to provide an absorber for an air-cooled continuously operating absorption refrigerating apparatus of the type using an inert pressure equalizing medium in which the absorption solution leaving the absorber and returning to the boiler is richer, and the inert medium leaving the absorber and going to the evaporator has less refrigerant vapor mixed therewith and is cooler than in previously known air cooled machines without the use of power driven air circulating means.

It is another object of this invention to provide a condenser for an air-cooled absorption refrigerating apparatus in which the liquid refrigerant leaving the condenser is cooler relative to the cooling air temperature than in previously known machines without the use of power driven air circulating means.

Another object of the invention is to so locate heat exchange elements of the novel form herein disclosed in an air flue as to increase the volume of cooling air flowing therethrough whereby a greater quantity of heat can be transferred to the air by a smaller heat exchange element located in a smaller flue than has been possible with constructions heretofore known.

Other objects and advantages will become apparent as the description proceeds when taken in connection with the accompanying drawings, in which.

Figure 1:
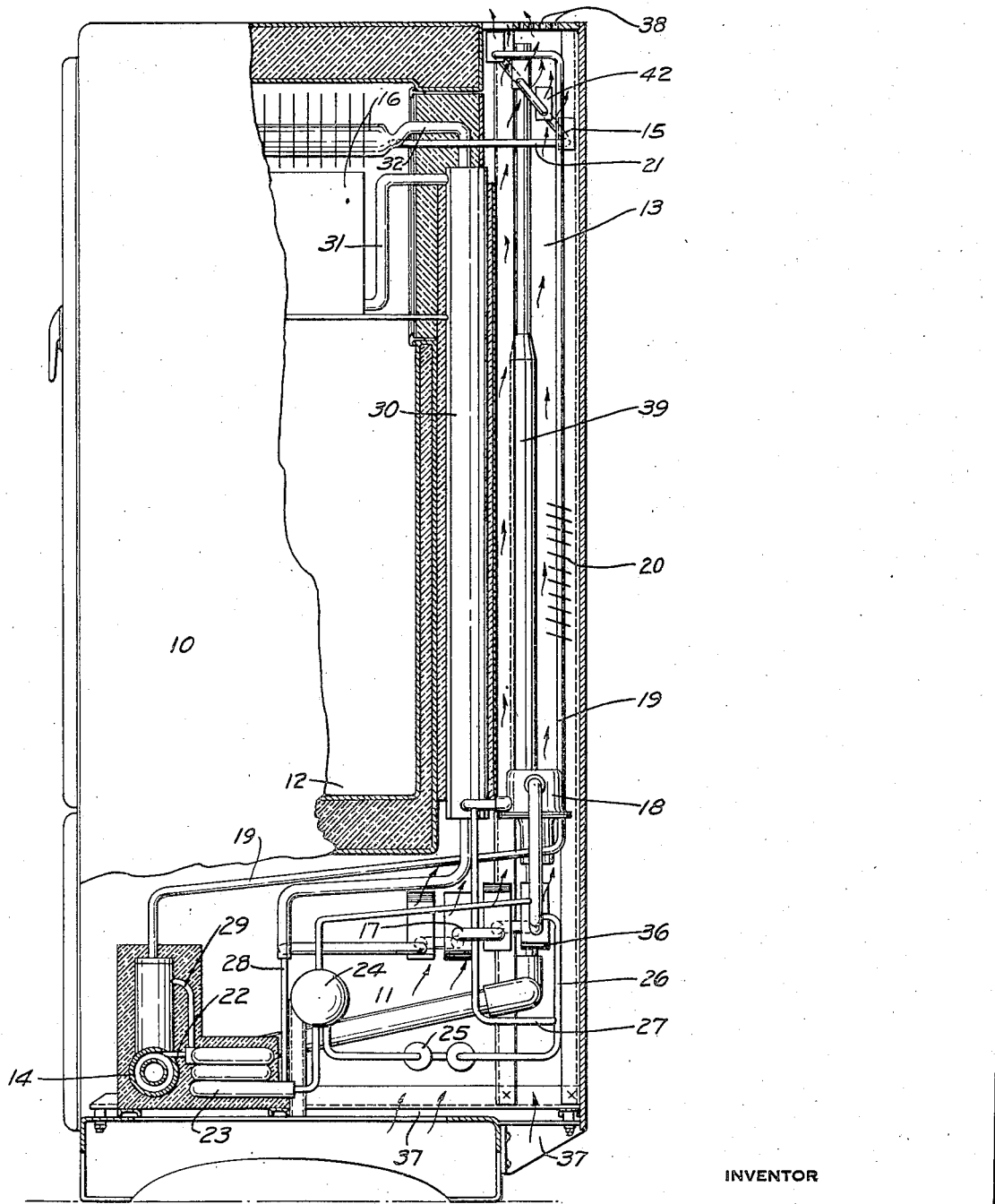
Figure 1 shows the invention applied to an absorption refrigerating apparatus mounted on a domestic refrigerator cabinet with the walls of the cabinet broken away to show the various parts of the apparatus.

Referring to Figure 1, numeral 10 indicates a cabinet for a domestic refrigerator having an apparatus compartment 11 and a food storage compartment 12. The apparatus compartment includes a vertically extending air flue 13 to provide for the circulation of air over the heat rejecting parts of the apparatus.

The refrigerating apparatus comprises a boiler 14, a condenser 15, an evaporator 16, an absorber 17, and a fan 18 all connected by suitable conduits to form a closed system. The system may be charged with any suitable fluids such as ammonia as the refrigerant, water as the absorbent, and nitrogen or hydrogen as the pressure equaling or evaporation accelerating medium.

The products of combustion produced in heating the boiler pass through the flue 39 which may extend upwardly through one corner of air flue 13.

Heat is applied to the boiler to drive off refrigerant vapor from a rich solution thereof in the boiler. The refrigerant vapor and any absorbent vapor driven off passes through pipe 19 to rectifier 20 where the absorbent vapor is condensed and flows backwardly to the boiler. The refrigerant vapor continues to the condenser 15 where it is condensed and flows by pipe 21 to the evaporator 16.

The weakened solution leaves the boiler by pipe 22, flows through the inner pass of solution heat exchanger 23 to solution reservoir 24, continues to pre-cooler 25 and gas lift pump 26 to the top of the absorber 17. The gas lift pump 26 is operated by gas flowing through pipe 27 from the outlet of fan 18 into the pipe forming the gas lift pump where slugs of absorption solution are elevated to the top of the absorber 17. The weak absorption solution flows downwardly through the absorber by gravity and absorbs refrigerant vapor, continues through pipe 28, the outer pass of solution heat exchanger 23, and pipe 29 back to the boiler.

The evaporation accelerating medium leaves the outlet of fan 18, flows through the outer pass of gas heat exchanger 30, through pipe 31 to the bottom of the evaporator, and continues upwardly therethrough. The liquid refrigerant entering the evaporator by pipe 21 flows downwardly through the evaporator in counterflow to the evaporation accelerating medium and evaporates by diffusing into the evaporation accelerating medium, producing refrigeration. The mixture of refrigerant vapor and evaporation accelerating medium leaves the top of the evaporator 16 by pipe 32, flows through the inner pass of gas heat exchanger 30 to the bottom of the absorber 17. This mixture flows upwardly through the absorber in counterflow to the weak absorption solution entering at the top of the absorber. The absorption solution absorbs refrigerant vapor from the mixture while the evaporation accelerating medium continues to the inlet of the fan 18. As shown in Figure 1 a vent pipe extends from the top of the solution reservoir 24 to the pipe leading from the absorber 17 to the fan 18.

Figure 2:
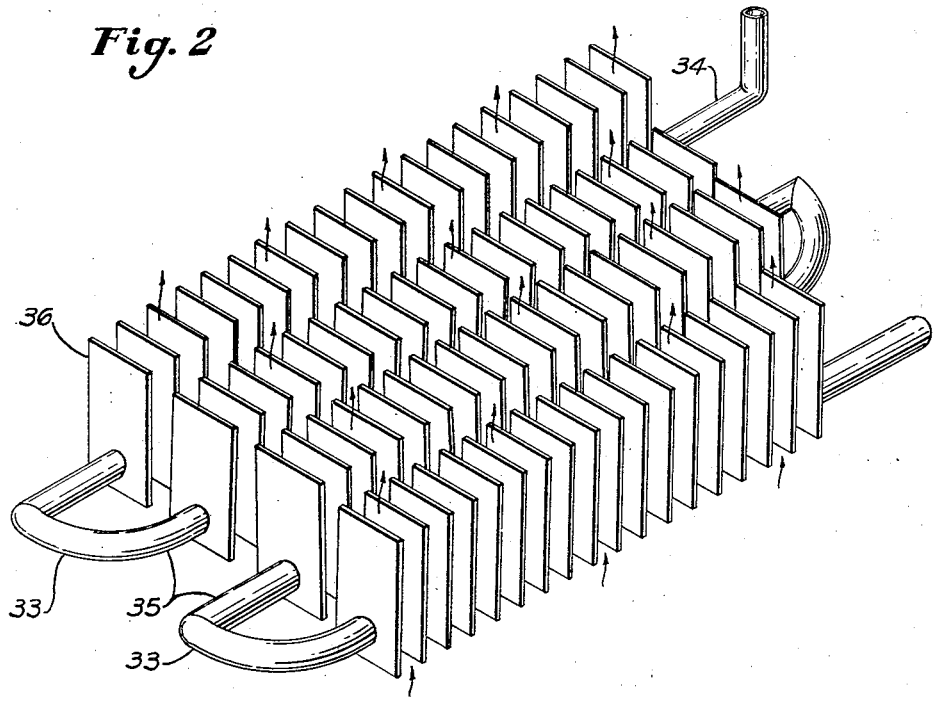
Figure 2 is a perspective view of one manner of constructing an absorber for an absorption refrigerating apparatus in accordance with the present invention.

As shown in Figure 2, the absorber comprises a plurality of similar sections 33 of tubing each of which is straight except for a bent portion at one end. In the embodiment of Figures 1 and 2, the fins are pressed over the straight ends of each section after which the bent end of one section is joined to the unbent end of an adjacent section in such manner as to provide a heat exchanger which slopes downwardly substantially throughout its length for continuous downward gravity flow of the absorption solution. It will be understood, of course, that where gravity flow through the conduit sections is not essential, the sections may be secured so that the same lie in the same plane. The legs 34 and 35 of the sections are provided with fins 36 in a novel manner so as to dissipate the heat of solution into the air flowing up over the absorber. As shown in Figure 1, the air enters through openings 37 in the bottom of the apparatus compartment 11, flows upwardly over the absorber as shown by the arrows in Figure 1, continues to air flue 13, flows over condenser 15 and leaves the top of the flue 13 by openings 38.

As shown, the fins 36 are offset on the legs 34 and 35 towards the side of the absorber opposite that of the incoming air. The incoming air contacts the comparatively warm tubes 34 and 35, taking up heat therefrom, continues to wipe the surface of the fins 36 taking up heat from the fins, continues up the flue 13, wipes the fins 42 of the condenser 15 taking up more heat and leaves by the openings 38.

Condenser 15 is preferably constructed in a manner similar to that of the absorber except that the sections may all lie in the same plane. Fins 42 are so positioned on the sections that the fins of each section are offset to one side of the fins on adjacent sections when the condenser is mounted in an inclined position in air flue 13, as is clearly shown in Figure 1. There are a number of important reasons for this arrangement among which are the following: If the condenser is inclined across the top of the air flue it will be manifest that a maximum sized condenser may occupy a minimum vertical portion of the air flue, and thus permit the evaporator to be located higher in the food compartment. Then too, with this arrangement, the cooling air rising in the air flue only transverses one section of the condenser. Thus the warm air discharging from a lower section does not pass into contact with a higher section of the condenser, and all sections of the condenser are contacted by cool air. This results in highly efficient heat transfer and in the rapid expansion of all portions of the air. And this causes a greatly increased flow of air through the air flue and over all portions of the condenser. It is also to be noted that the greatest rise in the cooling air temperature will occur at the warmest portions of the condenser. This will result in a greater flow of air over this portion of the condenser because the convection currents will be greater at that point. Another feature is the discharge of the warm air away from instead of toward the food storage compartment as has been the practice heretofore.

The fact that the air first contacts the warm tube and the fact that the fins are set higher on the tube produces a higher average air temperature in the column of air between the fins, resulting in a faster flow of air over the tubes and fins than if the fins were set lower down on the tube. Since more air is circulating over the absorber and condenser, more heat will be dissipated, and the absorber and condenser will operate far more efficiently, whereby it is possible to make the absorber and condenser smaller for a given capacity than formerly. Since a higher average temperature exists in the column of air between the fins of my novel construction, the ultimate temperature is also higher and a greater percentage of the cooling effect of the air is utilized. The very appreciable saving in cost of construction as well as saving of space is at once apparent.

Although the reason for the increased flow of air over the above described type of exchanger is not fully understood, it is believed to be due in part to the following factors: If the fins extend above and below the tube an equal amount as has been customary, the air in the space between the fins below the tube is comparatively cool and heavy relative to that above the tube so that the chimney effect of the column of air between the fins is not as great as when the fins extend substantially entirely above the tube in which case all the air between the fins is relatively warm, light air. Due to this fact, an increased chimney effect and a corresponding increased circulation of air is obtained without the necessity of resorting to power driven means for circulating the cooling air.

To amplify this theory of operation even further, it will be clear that the cold air immediately contacts the warm tube and the warmest part of the fins. Consequently, a maximum heat transfer occurs at this point causing the air to rise and expand rapidly. This expansion however, is restricted by the fins thus creating a suction effect and a turbulent flow of air. This results in a faster flow of air and better contact between the air and the heat exchange surfaces. As the quantity of air flowing upwardly between the fins increases, so also does the tubulence. This results in a better wiping action of the air on the fin surfaces, so that a greater percentage of the cooling effect of the air is utilized. With the fins positioned centrally on the exchanger tube, the cold, slow, moving air in the space between the fins, below the tube, creates a sort of dam immediately below the tube and insulates the hot tube from the upwardly flowing air.

In addition to the increased circulation of air over the tubes, the better wiping action created by the turbulent flow and the fact that the cold air contacts the hottest part of the fins first, results in a increased efficiency of the fins themselves and a greater utilization of the cooling effect of the air.

Another advantage of having the fins offset is that the lowest temperature to which the fluid in the tube can be reduced, relative to the temperature of the cooling air is lowered, and a greater temperature diffrential exists between the fluid in the tube and the air contacting the tube so that a greater percentage of the cooling effect of the air is made available.

Suppose, for example, that the temperature of the fluid in the tube is 130° F. and that of the cooling air 70° F. With the fins extending both above and below the tube, the air contacting the tube would be somewhere between these two temperatures, say 90° F. In this case the lowest possible temperature to which the fluid in the tube could be reduced would be 90° F. and the temperature differential between the fluid in the tube and the air contacting the tube would be only 30° F. This would result in only a small percentage of the cooling effect of the air being utilized.

On the other hand, with the fins offset upwardly, the 70° F. air contacts the tube itself and the lowest temperature to which the fluid in the tube could be reduced would be 70° F. At the same time, a temperature differential of 60° F. exists between the fluid in the tube and the air contacting the tube so that a greater percentage of the cooling effect of the air is available.

This is of particular advantage in air-cooled absorption refrigerating machines since only a small temperature differential exists between the cooling air and the fluid in the heat rejecting parts of the apparatus.

The increased circulation of air over the heat rejecting parts of the apparatus without the use of power driven air circulating means is also of particular advantage in an air-cooled absorption machine since the solution leaving the absorber and returning to the boiler can be made stronger in refrigerant content in the absorber, with a given air temperature, due to the lowered absorber temperature, so that more refrigerant is available for driving off in the boiler.

In addition, the inert medium leaving the absorber for the evaporator is cooler and has less refrigerant vapor mixed therewith so as not to unduly heat the evaporator and to be better able to pick up refrigerant vapor in the evaporator. The liquid refrigerant flowing into the evaporator from the condenser is also cooler for a given air temperature so as to be comparatively cool as it enters the evaporator. This results in a faster diffusion of the liquid refrigerant into the inert medium.

While the invention thus far described has been shown as applied to the absorber and condenser of an absorption refrigerating apparatus, it is obvious that it is not limited thereto but could be applied to condensers for other types of refrigerating machines, as well as to heat exchangers in general.

Figure 3:
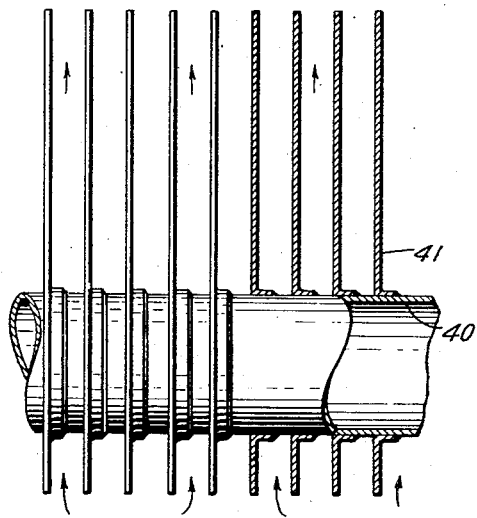
Figure 3 is a detailed view on an enlarged scale of my novel heat exchanger.

Figure 3 is an enlarged fragmentary view of the heat exchanger showing one manner in which fins 41 may be secured to a fluid conveying means such as conduit 40. The openings in the fins are punched out in such a manner that the material around the opening is stretched somewhat when the fins are inserted over one end of member 40 in order to insure a good thermal bond between the fins and conduit 40. In addition, the fins may be bonded to the fluid conveyor as by tinning, brazing, welding, or by any other suitable method to obtain a more permanent bond. Note the small amount of fin area on the lower side of member 40 and the relatively great fin area on the upper side, as well as the long chimney provided by the fins on the upper side.

Figure 4:
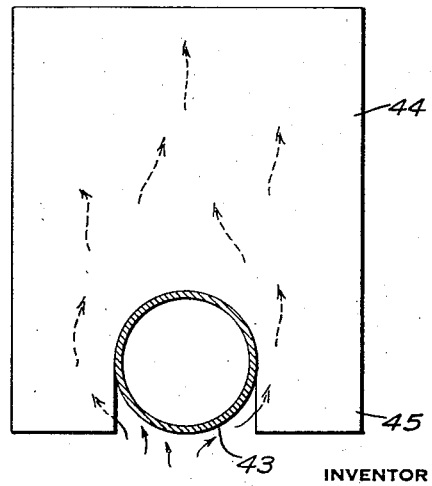
Figure 4 shows another embodiment of the invention.

Figure 4 shows a heat exchange tube 43 with fins 44 notched at the lower edge so as to form skirts 45 which straddle the tube making it unnecessary to thread the tubes through the fins as in the first embodiment. The fins 44 may be bonded to the tube 43 in any suitable manner as suggested above.

Air flowing up over the exchanger as shown by the arrows will contact the hot tube both between the fins and below them so as to be heated appreciably before it wipes the surface of the fins and thereby a faster circulation of air over the exchanger will result. The cold air in the space between the skirts 45 will hold the air immediately below the tube from flowing out laterally so that it will expand upwardly about the tube. This will result in an increased flow of air over the tube as well as an increased turbulence, thereby producing an increased heat transfer from the tube and fins to the upwardly flowing air. The air in the space between the fins above the tube will be comparatively warm and create an increased chimney effect to augment the circulation of air over the exchanger. The cold air contacting the hottest part of the fins will also result in a greater utilization of the cooling effect of the air.

A particular advantage of this construction is that the fluid conveyor 43 need not be made from individual sections secured together as by welding. Instead member 43 may be a continuous conduit bent into the desired sinuous form. The fins are then pressed upon the member wherever desired, and all may be pressed in place simultaneously, in groups, or individually. Of course, the fins may be placed on the conduit before the same is bent into the sinuous form, if desired.

From the foregoing it can be seen that this invention has provided a new and improved heat exchanger of general application as well as one which is especially well adapted for use in refrigerating systems of the air cooled type. The invention is particularly advantageous when incorporated in an absorber or condenser vessel of refrigerators because of its greater efficiency in operation and in the utilization of space.

While I have shown but two embodiments of my invention, it is to be understood that these embodiments are to be taken as illustrative only and not in a limiting sense. I do not wish to be limited to the specific structure shown but to include all equivalent variations thereof except as limited by the scope of the claims.

I claim:

1. A refrigerating apparatus comprising a cabinet, means forming a cooling air duct with one wall of the cabinet, a condenser positioned in the top portion of the air duct, said condenser comprising a coiled conduit having transverse portions and connecting portions arranged in a single inclined plane for downward flow of condensate therethrough and each transverse portion being so positioned relative to the air duct and to adjacent transverse portions that air flowing over one portion will not contact the adjacent portions and the air flowing over the hottest transverse portion will set up a chimney effect to increase the circulation of air over the hottest transverse portion above that flowing over the other transverse portions, and separate vertically extending heat exchange fins on each of said transverse portions having a greater area on the side of the condenser opposite that of the incoming air, the length of said fins being such that the top of the fins on a lower transverse portion extend upwardly to a point substantially on the horizontal plane of the next succeeding transverse portion.

2. A refrigerating apparatus comprising a food storage compartment, an air flue extending upwardly along one side thereof including an apparatus chamber, an absorption refrigerating apparatus including an absorber vessel in such chamber and a condenser vessel in said flue, both of said vessels comprising a sinuous conduit extending transversely in a single inclined plane in the path of air flow through the flue and having transverse portions and connecting portions, each transverse portion being so arranged relative to adjacent transverse portions that air flowing over one transverse portion does not contact adjacent transverse portions, a plurality of vertically extending fins on each of said transverse portions and offset therefrom in a direction of air flow whereby the air contacts the warm conduit, becomes heated and expands between the adjacent fins in the direction of flow to increase the velocity and volume of air flowing through the flue, the fins on said condenser being of such length that the fins on a lower transverse portion extend upwardly to a point substantially on the horizontal plane of the next higher transverse portion.

3. In an absorption refrigerating apparatus, a cabinet forming a food storage compartment and an apparatus compartment, said apparatus including a condenser, said apparatus compartment being provided with a duct for the circulation of air over said condenser, said condenser comprising banks of tubes having transverse portions and connecting portions inclined to cross said duct from front to rear so that air passing over each transverse portion does not contact adjacent transverse portions, and separate vertically extending offset fins on each of said tubes, the fins on a lower transverse portion extending vertically to a point substantially on the transverse plane of the next higher transverse portion.

CURTIS C. COONS.